(12) United States Patent
Chambers et al.

(10) Patent No.: US 8,812,844 B2
(45) Date of Patent: Aug. 19, 2014

(54) LUHN VALIDATION AND DATA SECURITY ACROSS MULTIPLE ACTIVE DOMAINS

(75) Inventors: Jason Chambers, Dunwoody, GA (US); Theresa Robison, Sandy Springs, GA (US); Dameion Dorsner, Atlanta, GA (US); Sridhar Manickam, Alpharetta, GA (US); Daniel Konisky, Atlanta, GA (US)

(73) Assignee: Liaison Technologies, Inc., Alphareta, GA (US)

( * ) Notice: Subject to any disclaimer, the term of this patent is extended or adjusted under 35 U.S.C. 154(b) by 143 days.

(21) Appl. No.: 13/527,852

(22) Filed: Jun. 20, 2012

(65) Prior Publication Data

US 2012/0324555 A1    Dec. 20, 2012

Related U.S. Application Data

(60) Provisional application No. 61/499,121, filed on Jun. 20, 2011.

(51) Int. Cl.
*G06F 21/00* (2013.01)
*G06F 15/173* (2006.01)

(52) U.S. Cl.
CPC .............. *G06F 21/00* (2013.01); *G06F 15/173* (2013.01)
USPC ............................................... 713/168; 726/6

(58) Field of Classification Search
CPC ............................... G06F 15/173; G06F 21/00
USPC ............................................... 726/6; 713/168
See application file for complete search history.

(56) References Cited

U.S. PATENT DOCUMENTS

| | | |
|---|---|---|
| 6,662,237 B1 | 12/2003 | Leckie |
| 7,710,988 B1 * | 5/2010 | Tripathi et al. ............... 370/411 |
| 7,891,563 B2 | 2/2011 | Oder, II et al. |
| 8,015,608 B2 | 9/2011 | LeVine et al. |
| 8,208,627 B2 | 6/2012 | Pauker et al. |
| 2002/0144153 A1 | 10/2002 | LeVine et al. |
| 2007/0198437 A1 | 8/2007 | Eisner et al. |
| 2007/0199074 A1 | 8/2007 | LeVine et al. |
| 2008/0283582 A1 | 11/2008 | Oki et al. |
| 2009/0169016 A1 | 7/2009 | Dodd |
| 2009/0249082 A1 | 10/2009 | Mattsson |

(Continued)

OTHER PUBLICATIONS

USPTO; Office Action; issued for U.S. Appl. No. 13/040,133, filed by Palgon et al.; submitting cover page, summary, detailed cation, index of claims, search information, search results, and e-mail notification; Office Action dated Nov. 29, 2012 (USPTO Alexandria, Virginia).

(Continued)

*Primary Examiner* — Jacob Lipman
(74) *Attorney, Agent, or Firm* — FisherBroyles, LLP; Richard Lehrer; Anthony J. DoVale

(57) ABSTRACT

Systems and methods for maintaining data security using Luhn validation in a multiple domain computing environment are presented. Each domain includes a token generator that can generate tokens associated with sensitive data such as credit card numbers. The token generation algorithm includes a Luhn validation routine for producing a tokenized data string that either passes or fails Luhn. The possibility of token collision is eliminated by a token generation algorithm that embeds a domain designator corresponding to the active domain where the token was created. When multiple tokens represent the same sensitive data, the token manager returns a set of all such tokens found.

25 Claims, 5 Drawing Sheets

Sensitive Data 10 → 375257  122500  3125

Token 200a → 375257  X4gmbAdL4Qz  3125

Head 202a    Body 204a    Tail 206a

(56) References Cited

U.S. PATENT DOCUMENTS

| | | |
|---|---|---|
| 2009/0294527 A1 | 12/2009 | Brabson et al. |
| 2010/0070754 A1 | 3/2010 | Leach |
| 2010/0122349 A1 | 5/2010 | Levine et al. |
| 2010/0257612 A1 | 10/2010 | Mcguire et al. |
| 2010/0306552 A1 | 12/2010 | Levine et al. |
| 2010/0318468 A1 | 12/2010 | Carr et al. |
| 2011/0125597 A1 | 5/2011 | Oder, II et al. |
| 2011/0154466 A1 | 6/2011 | Harper et al. |
| 2011/0154467 A1 | 6/2011 | Bomar et al. |
| 2011/0213807 A1 | 9/2011 | Mattsson |
| 2011/0258123 A1 | 10/2011 | Dawkins et al. |
| 2012/0023261 A1 | 1/2012 | Lindsay et al. |
| 2012/0317036 A1 | 12/2012 | Bower et al. |

OTHER PUBLICATIONS

Philip Howard; expressor 3.5 to 4.0; A Bloor InDetail Paper; Dec. 2011; pp. 1-15 (Bloor Research International Limited; London, United Kingdom).

Scoping Special Interest Group (SIG), Tokenization Taskforce, Payment Card Industry (PCI) Security Standards Council; Information Supplement: PCI Data Security Standard (DSS) Tokenization Guidelines; Aug. 2011; pp. 1-23; Version 2.0 (PCI Security Standards Council, LLC; Wakefield, Massachusetts USA).

* cited by examiner

Sensitive Data 10 → 375257  122500  3125

Token 200a → 375257 X4gmbAdL4Qz 3125
             Head      Body      Tail
             202a      204a      206a

FIG. 2A

Sensitive Data 10 → 375257  122500  3125

Token 200b → 375257  433902  3125
             Head     Body    Tail
             202b     204b    206b

FIG. 2B

Sensitive Data 10 → 3752 57122500 3125

Token 200f → 3752 8903374 X 3125

Head 202f   Body 204f   Tail 206f

LUHN VALIDATION AND DATA SECURITY ACROSS MULTIPLE ACTIVE DOMAINS

CROSS-REFERENCE TO RELATED APPLICATIONS

This application claims the benefit of and priority to U.S. Provisional Application No. 61/499,121, entitled "Token Manager for Data Protection," filed Jun. 20, 2011, which is herein incorporated by reference in its entirety.

TECHNICAL FIELD

The following disclosure relates generally to data security applications and, more particularly, to systems and methods for maintaining data security between and among multiple active domains.

BACKGROUND

The proliferation of business-critical and sensitive electronic data creates a data security challenge, especially when sensitive data is collected in geographically distant locations and stored in multiple applications and databases for later processing.

Data encryption uses an encryption key to encrypt the sensitive data. The resulting encrypted data, sometimes called cipher text, can be stored in a database. The encrypted data is generally larger than the original value, requiring more space. Storing the encryption key in the same place exposes the encrypted data to easy decryption if the database is compromised.

Another layer of security is sometimes provided in the form a token that represents or acts as a pointer to the encrypted data. Token collision occurs when the same token is assigned to represent two different items of sensitive data. Most existing token-based solutions require a centralized implementation with a single data store in order to minimize the risk of token collision, and to ensure a one-to-one relationship between a token and the sensitive data it represents. Controlling or resolving token collision is a significant challenge, especially in computing environments with multiple active domains located in distant territories. Efforts at eliminating token collision have been unsuccessful.

The Luhn algorithm, also known as the modulus 10 algorithm, is a checksum formula that is frequently used to validate a variety of numbers, including credit card numbers, mobile phone identification numbers, health care provider numbers, Canadian social insurance numbers, and the like. When the Luhn algorithm is used to check the validity of sensitive data such as credit numbers, it adds an additional layer of complexity and creates problems that remain unsolved by existing token-based solutions.

SUMMARY

According to various embodiments, a method of generating a format-preserving token for sensitive data includes the steps of: (1) receiving from a client process an input data string corresponding to sensitive data; (2) generating a tokenized data string according to a token generation algorithm that includes a Luhn validation routine and a string length determiner, wherein the data values of the characters in the tokenized data string are independent of the data values of at least a portion of the characters in the input data string; and (3) returning the tokenized data string to the client process in response to a request. In another aspect, the tokenized data string has a total string length, according to the string length determiner, that is equal to the length of the input data string.

In other aspects of the method, the tokenized data string is generated such that it passes the Luhn validation routine. The token generation algorithm calculates a single check digit according to the Luhn validation routine, and includes the check digit in the tokenized data string. Alternatively, the tokenized data string is generated such that it fails the Luhn validation routine. In another alternative, the tokenized data string is generated such that need not necessarily pass or fail the Luhn validation routine. Optionally, the token generation algorithm does not execute the Luhn validation routine.

In another aspect of the method, the tokenized data string has a total string length of N characters, and the token generation algorithm is configured to: (i) preserve X characters of the input data string as a head portion of the tokenized data string; (ii) generate a body portion of the tokenized data string having a string length of Y characters; and (iii) preserve Z characters of the input data string as a tail portion of the tokenized data string, wherein X, Y, Z, and N are integers, and wherein X plus Y plus Z equals N. The body portion comprises: (a) a number having a string length of (Y−1) characters, and (b) a single check digit calculated according to the Luhn validation routine. The body portion is generated such that the tokenized data string passes (or fails) the Luhn validation routine. The number having a string length of (Y−1) characters is a random number or a sequence number.

In another aspect, the method is configured to operate in a multiple domain environment, and includes the steps of: (4) establishing a first data vault located at a first domain, and a replica of the first data vault at each of a plurality of second domains; (5) establishing a plurality of second data vaults, each located at one of the plurality of second domains, and establishing a replica of each the plurality of second data vaults at the first domain; (6) receiving the input data string at the first domain; (7) searching the first data vault to determine if a first tokenized data string corresponding to the input data string exists therein and, if found, returning the first tokenized data string to the client process and, if not found: (8) searching each the replica of each of the plurality of second data vaults to determine if a second tokenized data string corresponding to the input data string exists therein and, if found, returning the second tokenized data string to the client process and, if not found: and (9) executing the step of generating a tokenized data string, wherein the token generation algorithm is configured to embed within the new tokenized data string a domain designator corresponding to the first domain. The method may also include: (10) storing the tokenized data string in the first data vault; and (11) updating the replica of the first data vault at each of the plurality of second domains.

In a further aspect of this method, the tokenized data string comprises (a) the domain designator, (b) a number having a string length of (N−2) characters, and (c) a single check digit calculated according to the Luhn validation routine, wherein the tokenized data string has a total string length of N characters, and N is an integer. The tokenized data string is generated such that it passes (or fails) the Luhn validation routine.

Where the body portion of the tokenized data string has a string length of Y characters, the body portion comprises (a) the domain designator, (b) a number having a string length of (Y−2) characters, and (c) a single check digit calculated according to the Luhn validation routine, wherein the domain designator comprises a single digit between zero and nine. The tokenized data string is generated such that it passes (or fails) the Luhn validation routine.

In yet another aspect, the method may recognize multiple tokens associated with the same sensitive data, and may include the steps of: receiving a token lookup request from a second client process; searching the first data vault, which optionally contains the first tokenized data string including a first domain designator therein; searching at least one of the replicas of each of the plurality of second data vaults, which optionally contains the second tokenized data string including a second domain designator therein; and returning to the second client process a set of tokens including the first tokenized data string and the secondary tokenized data string. The second client process selects for its use a token from the set of tokens.

BRIEF DESCRIPTION OF THE DRAWING

Figure 1:
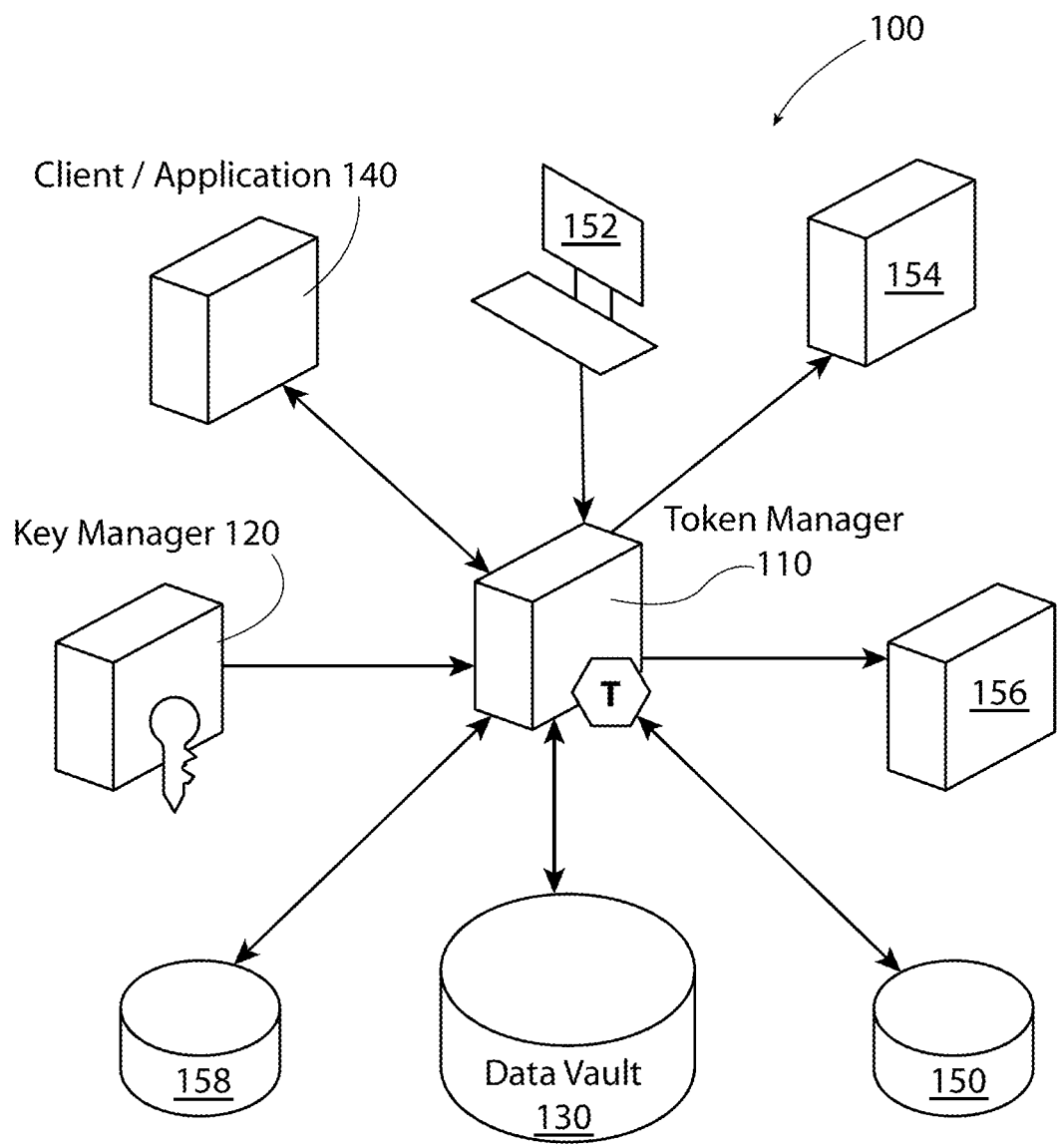

Having thus described various embodiments in general terms, reference will now be made to the accompanying drawings, which are not necessarily drawn to scale, and wherein:

FIG. 1 is an exemplary system architecture diagram, according to particular embodiments.

FIG. 2A is an illustration of sensitive data and a corresponding token, according to particular embodiments.

FIG. 2B is an illustration of sensitive data and a corresponding token, according to particular embodiments.

Figure 3A:
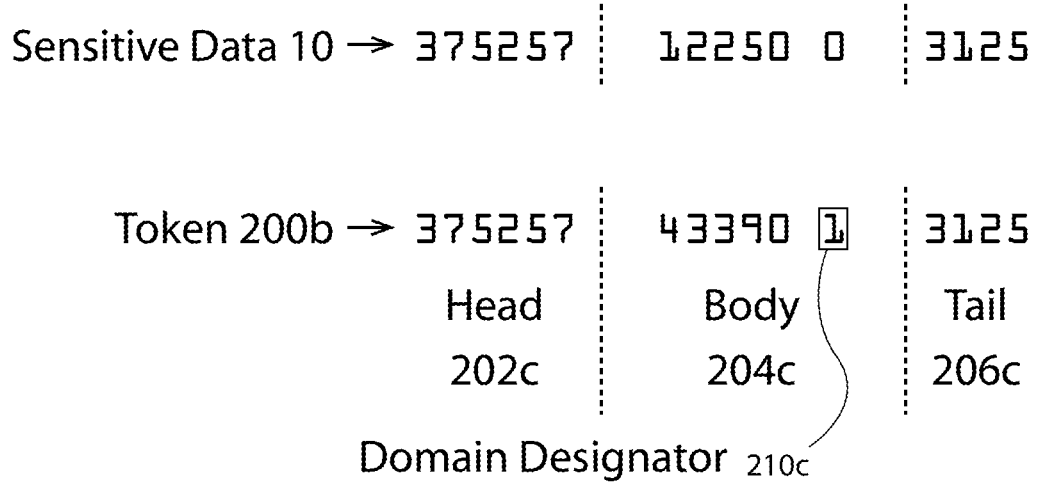

FIG. 3A is an illustration of sensitive data and a corresponding token including a domain designator, according to particular embodiments.

Figure 3B:
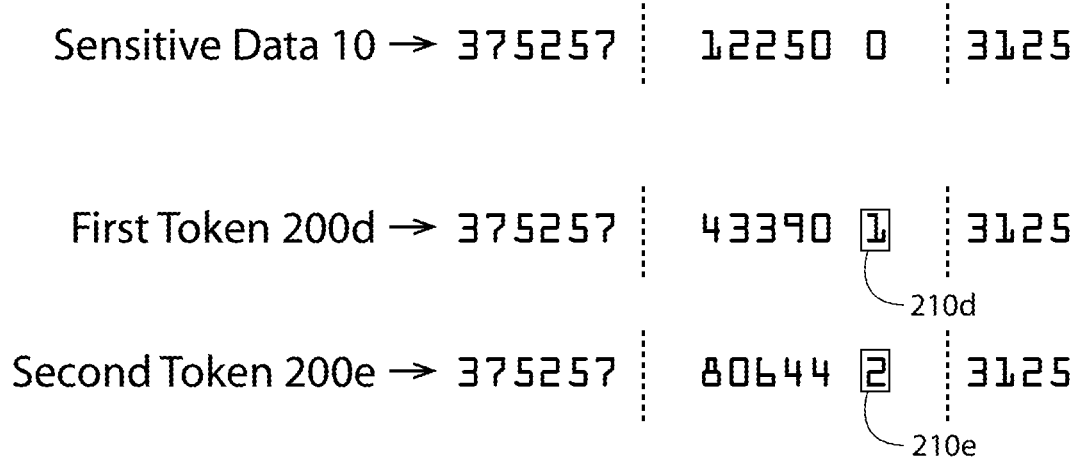

FIG. 3B is an illustration of sensitive data and an apparent token collision between tokens that each include a domain designator, according to particular embodiments.

Figure 4:
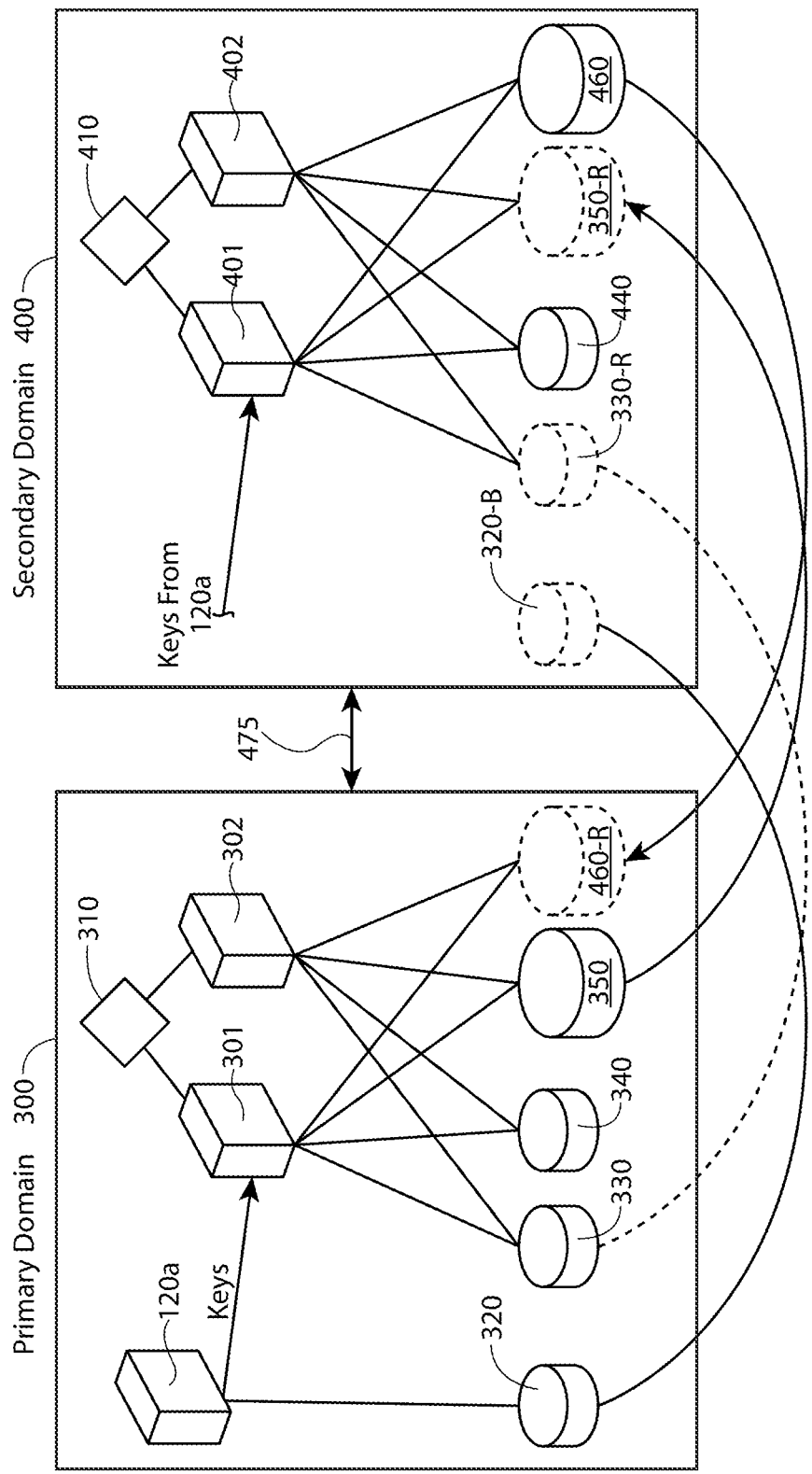

FIG. 4 is an exemplary diagram of a multiple domain computing environment, according to particular embodiments.

FIG. 5 is an illustration of sensitive data and a corresponding token including a domain designator and a check digit, according to particular embodiments.

DETAILED DESCRIPTION

The present systems and apparatuses and methods are understood more readily by reference to the following detailed description, examples, drawing, and claims, and their previous and following descriptions. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching in its best, currently known embodiment. To this end, those skilled in the relevant art will recognize and appreciate that many changes can be made to the various aspects described herein, while still obtaining the beneficial results of the technology disclosed. It will also be apparent that some of the desired benefits can be obtained by selecting some of the features while not utilizing others. Accordingly, those with ordinary skill in the art will recognize that many modifications and adaptations are possible, and may even be desirable in certain circumstances, and are a part of the invention described. Thus, the following description is provided as illustrative of the principles of the invention and not in limitation thereof.

As used throughout, the singular forms "a," "an" and "the" include plural referents unless the context clearly dictates otherwise. Thus, for example, reference to "a" component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Exemplary Tokenization System

Aspects of this disclosure relate to systems and methods for protecting and using sensitive data such as credit card numbers in compliance with regulations and best practices. Although the systems and methods are described herein primarily within the context of credit card numbers, the technology described herein is useful and applicable for protecting any type of sensitive data, such as social security numbers, passport numbers, license numbers, account numbers, payroll data, national health insurance numbers, personally-identifiable information (PII) such as name and date of birth, and the like.

FIG. 1 illustrates the architecture for an exemplary system 100, according to particular embodiments. The system 100 as shown includes four distinct modules: a token manager 110, a key manager 120, a data vault 130, and a client/application 140.

The key manager 120 manages encryption keys that are used to encrypt sensitive data and permit only authorized users to reveal or otherwise access the sensitive data. The encryption keys may be distributed to the token manager 110 for use in encryption and decryption functions.

The token manager 110 is a central part of the system 100, providing tokenization, encryption, client management, event logging, and administrative functions. Tokenization describes the process of receiving sensitive data and generating a token to be used in its place. The token manager 110 generates the token, encrypts the original sensitive data, and stores the encrypted data (cipher text) in the data vault 130. The encrypted data is stored only in the data vault 130. The token is a reference to the encrypted data; there is no mathematical relationship between a token and the encrypted data. Therefore, the token may be safely used throughout the system 100, while the encrypted data it represents remains stored in the data vault 130. The token manager 110 ensures that there is a one-to-one relationship between the sensitive data and the generated token, so that referential integrity is maintained throughout the system 100.

The data vault 130 is a depository such as a database for storing the tokens and the encrypted data. The data vault does not store the encryption key, which is stored and controlled using the key manager 120. In particular embodiments, the data vault 130 may store a key profile number or other pointer that indicates which key was used to encrypt the data. The token manager 110 may use a data access technology such as JDBC (Java Database Connectivity) to communicate with the data vault 130.

The client or application 140 may be any of a variety of applications or platforms involved in the collection, handling, or processing of sensitive data. For example, the client/application 140 may be a financial application for processing or analyzing payments received by a business enterprise. Another client/application 140 may be a point-of-sale device such as a cash register or payment card reader. In particular embodiments, integration of client/applications 140 may be accomplished through SOAP/web services. In this aspect, any application 140 that supports web services can be integrated with the token manager 110 and may be configured to make calls to tokenize/encrypt sensitive data or, if authorized, to decrypt/access the sensitive data.

As illustrated in FIG. 1, the system 100 may include other modules depending on the implementation. For example, the system 100 may include a directory 150 includes a database for storing any type of data useful in the system 100. For example, the directory 150 may include client IP addresses, hostnames, user identities, client role definitions, client permissions and data access policies, and the like. The token manager 110 may use LDAP or another protocol for accessing and maintaining the directory 150.

The system 100 may also include an administrator 152 with access to the token manager 110. The administrator 152 may use HTTP/S or another secure protocol for communicating with the token manager 110.

The token manager 110 and the key manager 120 may be configured to generate security event messages via Syslog. These logs can be directed to an event log 154 which may include an event management application (SIEM) for logging, collecting, storing, analyzing, and/or reporting events.

The token manager 110 may also be configured to send e-mail alerts using an e-mail server 156 via SMTP or similar protocol. The system 100 may also include a metadata store 158.

In use, the token manager 110, according to particular embodiments, receives sensitive data from an application 140 along with a request to protect it, generates a token, and inserts the token in place of the sensitive data. The key manager 120 supplies an encryption key to the token manager 110, which then encrypts the sensitive data and stores the encrypted data (cipher text) in the data vault 130. Tokens can be used safely in any application or database without exposing the sensitive data.

When an application 140 or database requires the original sensitive data, the application 140 transmits a request (by web services call, for example) to the token manager 110 and presents the token. The token manager 110 validates the credentials of the requesting application and, if authorized, looks-up the token in the data vault 130, identifies the matching cipher text, decrypts the cipher text, and returns the original sensitive data back to the application 140.

According to particular embodiments, the system 100 ensures a one-to-one relationship between a token and the sensitive data it represents. The data vault 130 contains a single encrypted version of each original sensitive data. Even when encryption keys change over time, there is only one instance of the encrypted value stored in the data vault 130. In use, this means that the returned token will consistently represent the same original data throughout the system 100, in different applications and across multiple data sets.

Token Characteristics

The token manager 110 in particular embodiments may be configured to generate a token that is structurally similar in length and format to that of the original sensitive data. For example, as shown in FIG. 2A, a token 200a can be formatted to preserve any number of leading and trailing characters found in the original sensitive data 10. In the example shown, the head 202a includes the leading six characters, the tail 206a includes the trailing four, and the body 204a includes tokenized characters.

As shown in FIG. 2B, a token 200b can be formatted to preserve both the length and the data type (alpha or numeric, and the like) of the original sensitive data 10. In the example shown, the head 202b includes the leading six characters, the body 204b includes six numeric characters, and the tail 206b includes the trailing four characters. Any number (including zero) of the leading and/or trailing characters from the original sensitive data 10 may be preserved. The format-preserving tokenization process is also described in the commonly owned and co-pending U.S. patent application Ser. No. 13/040,133, entitled "System and Methods for Format Preserving Tokenization of Sensitive Information," which is herein incorporated by reference in its entirety.

The task of generating a token may be accomplished in one or more steps performed by a token generation algorithm. As described above, the token generation algorithm may be configured to generate a token that is independent of at least a portion of the data in a sensitive data string.

Multiple Active Domains

In particular embodiments, a domain includes a set of infrastructure including one or more token manager application servers installed in a cluster and configured to operate with a shared database infrastructure. Many business enterprises establish multiple data centers in different regions. A data center may be configured as a single domain. The systems and methods described herein may be deployed in multiple active domains in order to allow tokens to be generated in multiple locations simultaneously.

FIG. 4 is a system diagram illustrating a computing environment with multiple domains, according to particular embodiments. The diagram includes a primary domain 300 and a secondary domain 400, which of course may represent a plurality of secondary domains. The primary domain may be designated as the main or master domain; all the other domains are designated as secondary. Certain administrative functions, such as those relating to key management, client processes and applications, client roles, API keys, and the like, must be done from the primary domain so that changes can be replicated properly to all the secondary data centers.

The communication link 475 between the domains 300, 400 in some embodiments is not a direct coupling. Instead, the domains 300, 400 are linked only via the data layer and database replication operations.

As shown, the primary domain 300 includes a first and second primary token manager servers 301, 302 deployed in a cluster and managed by a primary load balancer 310. Similarly, the secondary domain 400 includes a first and second secondary token manager servers 401, 402 managed by a load balancer 410. In particular embodiments, all incoming requests are dynamically routed by the load balancer to one of the token manager servers. Requests may be distributed equally or directed to the token manager server that has available capacity.

Each domain includes its own token manager(s) and its own locally deployed data vault. For example, the primary domain 300 includes a primary data vault 350. The secondary domain 400 includes its own secondary data vault 460.

Each domain also includes a replica of the data vaults from other domains. For example, the secondary domain 400 includes a primary data vault replica 350-R. The primary domain 300 includes a secondary data vault replica 460-R. The data vaults are replicated in their entirety. In particular embodiments, the replica vaults are read-only. For example, only the secondary domain 400 and its token managers 410, 402 can write data to the secondary data vault 460. The local data vaults and their remote replica vaults may be synchronized nearly continuously, in real-time or nearly real-time, so that the tokens and other data are available across all domains.

Key management is performed at the primary domain 300. Keys are generated and distributed to each domain 300, 400 by a primary key manager 120a. The primary key manager 120a cooperates with a key management database 320. A secondary key management database 320-B may be installed at one or more secondary domains; however, in particular embodiments, this secondary key management database 320-B operates as a backup in situations when the primary key manager 120a is not accessible.

Some data categories are shared across all domains; others are local. The primary engine database 330 and primary management database 340 contain operational information and metadata specific to the primary domain 300. The primary engine database 330 may be only partially replicated and stored as a replica primary engine database 330-R in a secondary domain 400. The secondary domain 400 has its own secondary management database 440.

The cooperation of multiple domains as illustrated in FIG. 4 and described herein provides scalability, high availability, disaster recovery, and centralized key management. Each domain is capable of generating tokens locally, which improves response time, especially for geographically dispersed, high-volume operations. Any number of secondary domains may be added as capacity increases or the enterprise expands into new territories. Each domain is capable of operating independently; if one domain fails, the other domains continue operating. Through the data propagation and replication described herein, each domain is shared or mirrored across all the domains. Even if the primary domain becomes inaccessible, the secondary domains have the necessary data. Centralized key management is controlled by the primary key manager 120a at the primary domain 300, and supported by a backup key management database 320-B at one or more secondary domains.

Domain Designators

In particular embodiments, each domain is assigned a unique domain designator. In order to facilitate sharing of data and tokens across multiple domains, a domain designator is embedded within the body of each token. For example, FIG. 3A illustrates a token 200c that includes a domain designator 210c that has been embedded (i.e., inserted) into the body 204c of the token. When this token 200c is encountered by any domain, the local systems can determine that this token 200c was generated by domain 1. For example, when a token 200c is presented to a domain along with a lookup request, the token manager can read the domain designator 210c, identify that the token 200c was generated by domain 1, and immediately search the data vault (or the replica data vault) that is associated with domain 1.

As illustrated in FIG. 3A, the domain designator occupies one character of the token 200c. Accordingly, the process of including the domain designator limits the process of format-preserving tokenization by removing one of the spaces available for a tokenized character. For example, if the token 200c preserves the leading six digits and the trailing four, the presence of the domain designator leaves only five spaces available for the tokenization process.

For tokens expressed in numeric characters only, or that are structurally similar in format to that of the original sensitive numeric data, the domain designator may be a single digit between zero and nine. Accordingly, in particular embodiments, if a system uses one or more numeric-only token formats, the system may have up to ten domains (zero through nine) that can generate numeric and/or alphanumeric tokens.

For tokens that include alpha characters, the domain designator may be a single digit (zero through nine) or any one of fifty-two alpha characters (a-z, A-Z). Accordingly, in particular embodiments, for a system that allows alphanumeric tokens, the system may have up to sixty-two domains, each with its own single-character domain designator.

As described herein, the task of generating a token may be accomplished in one or more steps performed by a token generation algorithm. The token generation algorithm may be configured to generate a token that is independent of at least a portion of the data in a sensitive data string. For example, in FIG. 3A, the body 204c is mathematically and otherwise independent of the corresponding data it represents in the sensitive data 10. The token generation algorithm may also be configured to embed within said token a domain designator that corresponds to the domain where the token was generated. The domain designator 210c in FIG. 3A indicates the token 200c was generated by domain 1.

The domain designator makes token collision impossible. Token collision occurs when the same identical token is assigned to represent two different items of sensitive data. The domain designator eliminates the possibility of token collision because every token includes the one-digit domain designator, which is always unique to the domain where the token was created. For example, the body of a token generated by domain 4 may include five randomly generated digits and the domain designator 4. Even if the body of a token generated by domain 7 includes the same five randomly generated digits, the body will include the domain designator 7 (not 4)—thereby preventing the generation of a duplicate token for the same sensitive data. Thus, the domain designator prevents the system from generating the same token to represent two different items of sensitive data.

The "Protect" Command: When the token manager at a local domain receives sensitive data such as a credit card number from a client process, along with a request to protect the data (i.e., encrypt the data and/or create a token), the token manager will search its own data vault—and each replica data vault—to determine if a token already exists. If an existing token is not found, the token manager will generate a new token locally and store the new token in its local data vault. New tokens are stored in the local data vault only, because the replica data vaults are read-only.

For example, referring to FIG. 4, the token manager 301 at the primary domain 300 receives a sensitive data string for tokenization from a client process. The token manager 301 will first search the primary data vault 350 to determine if a token corresponding to the sensitive data already exists. If an existing token is found, the token manager 301 will retrieve it and return it to the client. If an existing token is not found, the token manager 301 will next search the replica secondary data vault 460-R to determine if a token corresponding to the sensitive data was created by the secondary domain 400. If an existing token is found, the token manager 301 will retrieve it from replica secondary data vault 460-R and return it to the client. The search will continue until either an existing token is found or all replica data vaults have been searched. Then, if an existing token is not found, the token manager 301 will generate a new token (one that includes the domain designator for that domain), store the new token in the primary data vault 350, and return the new token to the client process.

Because the data vaults are synchronized on a nearly continuous basis, the new token in the primary data vault 350 will be propagated throughout the system of multiple domains in the latest copy of the replica primary data vault 350-R located at each secondary domain. Accordingly, if any secondary domain 400 receives a sensitive data string for tokenization, and the secondary token manager 401 conducts a search (as described above), it will find the new token in the replica primary data vault 350-R.

The "Lookup" Command: Because all token information is propagated across all the domains, any domain can lookup and reveal tokens generated by any other domain. The process of searching for existing tokens in multiple domains illustrates the power of the domain designator. Because any of the domains can generate a new token locally, there may be a separate token stored at each domain—each of which represents the same item of sensitive data. In a numeric-only token system, there may be up to ten domains. In a system that allows alphanumeric tokens, there may be up to sixty-two different domains. The domain designator enables the system to recognize multiple tokens associated with the same sensitive data and identify where each token was generated.

FIG. 3B illustrates a situation where a first token 200d and a second token 200e are associated with the same sensitive data 10. The first domain designator 210d indicates the first token 200d was created by domain 1. The second domain designator 210e indicates the second token 200e was created by domain 2. Although the domain designators 210d, 210e are located at the right end of the body portions, the domain designator may be positioned at any location within the token.

In operation, referring to FIG. 4, the token manager 301 at the primary domain 300 may receive a request to lookup a token from a client process. The token manager 301 will search all the data vaults—including the primary data vault 350 and all the replica secondary data vaults 460-R—to determine if a token already exists. If several tokens are found, in particular embodiments, the token manager 301 will return a set of all the tokens found to the client process. The client process may select for its use one or more tokens from the set.

Luhn Validation

The Luhn algorithm, also known as the modulus 10 algorithm, is a checksum formula that is often used to validate a variety of numbers, including credit card numbers, mobile phone identification numbers, United States health care provider numbers, Canadian social insurance numbers, and the like.

The systems and methods described herein may include a Luhn check of incoming sensitive data, such as credit card numbers, to confirm that the sensitive data passes Luhn and represents a valid number. In particular embodiments, the token manager will reject incoming sensitive data that does not pass a Luhn check.

Also, in particular embodiments, the token generation algorithm includes a Luhn validation routine to test the tokens being generated. A user may want tokens to pass Luhn, especially if one or more downstream applications also perform a Luhn check and will throw an error if the data does not pass. Other users may want tokens to fail a Luhn check, so that the tokens do not resemble valid credit card numbers. Still other users will not want a Luhn check performed on the tokens, and may choose to skip the routine. Providing the option to elect whether tokens should pass Luhn, fail Luhn, or skip the Luhn routine gives users the flexibility to select how the tokens in a particular system will be generated.

The Luhn validation routine, in particular embodiments, is executed so that the entire token, or tokenized data string, passes (or fails) the Luhn algorithm. In one embodiment, the token has a total string length that is equal to the length of the sensitive data. The token's string length may be set by a string length determiner in the token generation algorithm. For a token having a total string length of N characters, the token may be generated so that it contains (N−1) random numbers (or other numbers created by the token generation algorithm) and a single check digit, X, for the Luhn calculation.

Including a check digit X, together with a string of other numbers, and solving for X using the Luhn algorithm, is one way to generate a number that passes Luhn. The check digit X may be calculated by computing the sum of the digits and multiplying the sum by nine to obtain a number; the last digit in the number is the check digit X. An alternative way to calculate the check digit X is by computing the sum of the digits, selecting the last digit in the sum, and subtracting the last digit from ten; the result is the check digit X.

As described above and illustrated in FIG. 2A, a token 200a can be formatted to preserve any number of leading and trailing characters found in the original sensitive data 10. In FIG. 2A, the head 202a includes the leading six characters; the tail 206a includes the trailing four. The presence of preserved leading and trailing characters in a tokenized data string will, of course, affect the generation of the token as well as the calculation of the Luhn check digit. For example, in FIG. 5, the token 200f includes the leading four digits in the head portion 202f, the trailing four digits in the tail portion 206f. The middle digits are tokenized using the token generation algorithm and placed in the body portion 204f. As shown, the body portion 204f includes a check digit 500. The body portion 204f also includes a domain designator 210f. The Luhn validation routine may be used to calculate a check digit X such that the entire token passes Luhn. If the user elects to force its tokens to fail Luhn, the Luhn routine may calculate a passing check digit X and then increase its value by one (or more) to generate a Luhn-failing token. If the passing check digit is 9, then adding one to it results in a zero (not a 10) (because the check digit X is always a single integer).

Referring again to FIG. 5, the token generation algorithm may begin with "3752 nnnnnnnX 3125" where each n represents a digit to be tokenized or replaced with a surrogate number. The surrogate numbers may be random numbers, sequence numbers retrieved from a table, or other numbers created using any of a variety of methods. After the n's are generated, the check digit X is the only number remaining to be determined. The Luhn validation routine solves for X using one of the solution methods for the Luhn algorithm.

For example, for the numbers shown in FIG. 5, the sum of the digits is 62; 62 times 9 equals 558; the last digit, 8, is the check digit. The token generation algorithm, in this example, would replace the check digit X with 8, and return the token "3752 89033748 3125" (the spaces are included for clarity and would not necessarily be included in a token.

Alternatively, if the user elected to generate a Luhn-failing token, the token generation algorithm may add one the check digit, replace the X with 9, and return the token "3752 89033749 3125." The Luhn validation routine may be configured to re-check such tokens to confirm they fail Luhn.

Luhn Validation with Domain Designators

The exemplary token 200f shown in FIG. 5 includes a domain designator 210f in the body portion 204f. As described herein, the domain designator 210f may be used to identify the domain where a token was generated. As illustrated in FIG. 5, using a domain designator 210f and a check digit 500 reduces the number of characters in the body portion 204f that are available to be tokenized.

For reference, a token may have a total string length of N characters, including a head portion having X characters, a body portion having Y characters, and a tail portion having Z characters. X, Y, and Z are variables. The token generation algorithm may be adjusted so that any number of characters are part of the head, body, and tail. For the example shown in FIG. 5, the total string length N equals 16, X equals 4, Y equals 8, and Z equals 4. Because the domain designator 210*f* and the check digit 500 occupy two characters, there are (Y−2) characters available to be tokenized.

The presence of the domain designator 210*f*, and the presence of replica data vaults as described herein, allows the system to recognize multiple tokens that are associated with the same sensitive data.

Conclusion

Although the systems and methods are described herein primarily within the context of numerical data such as credit card numbers, the technology described herein is useful and applicable for protecting any type of sensitive data, such as social security numbers, passport numbers, license numbers, account numbers, payroll data, national health insurance numbers, personally-identifiable information (PII) such as name and date of birth, and the like. Moreover, although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims or concepts that follow, such terms are used in a generic and descriptive sense only, and should not be construed as limiting the described invention or the claims that follow.

The invention claimed is:

1. A method of generating a format-preserving token for sensitive data, said method comprising the computer-implemented steps of:
    receiving from a client process an input data string having a string of characters each having data values, said input data string corresponding to sensitive data;
    generating a tokenized data string according to a token generation algorithm that includes a string length determiner, breaking said input data string into a plurality of segments of characters each having data values; and replacing one of said plurality of segments with a tokenized segment of characters each having data values; wherein at least one of said characters in said tokenized segment includes a checksum;
    wherein the data values of the characters in said tokenized data string are independent of the data values of at least a portion of the characters in said input data string; and
    returning said tokenized data string to said client process in response to a request.

2. The method of claim 1, wherein said tokenized data string has a total string length, according to said string length determiner, that is equal to the length of said input data string.

3. The method of claim 1, wherein said tokenized data string is generated such that it fails said checksum validation routine.

4. The method of claim 1, wherein said tokenized data string is generated such that it passes a checksum validation routine.

5. The method of claim 4, wherein said token generation algorithm calculates a single check digit according to said checksum validation routine.

6. The method of claim 1, wherein said tokenized data string is generated such that it need not pass or fail a checksum validation routine.

7. The method of claim 6, wherein said token generation algorithm does not execute said checksum validation routine.

8. The method of claim 1, wherein said tokenized data string has a total string length of N characters, and wherein said token generation algorithm is configured to:
    preserve X characters of said input data string as a head portion of said tokenized data string;
    generate a body portion of said tokenized data string having a string length of Y characters; and
    preserve Z characters of said input data string as a tail portion of said tokenized data string, wherein X, Y, Z, and N are integers, and wherein X plus Y plus Z equals N.

9. The method of claim 8, wherein said body portion comprises (a) a number having a string length of (Y−1) characters, and (b) a single check digit calculated according to a validation routine.

10. The method of claim 9, wherein said body portion is generated such that said tokenized data string passes said checksum validation routine.

11. The method of claim 9, wherein said body portion is generated such that said tokenized data string fails said checksum validation routine.

12. The method of claim 9, wherein said number having a string length of (Y−1) characters is a random number or a sequence number.

13. The method of claim 1, configured to operate in a multiple domain environment, said method further comprising the computer-implemented steps of:
    establishing a first data vault located at a first domain, and a replica of said first data vault at each of a plurality of second domains;
    establishing a plurality of second data vaults, each located at one of said plurality of second domains, and establishing a replica of each said plurality of second data vaults at said first domain;
    receiving said input data string at said first domain;
    searching said first data vault to determine if a first tokenized data string corresponding to said input data string exists therein and, if found, returning said first tokenized data string to said client process and, if not found:
    searching each said replica of each of said plurality of second data vaults to determine if a second tokenized data string corresponding to said input data string exists therein and, if found, returning said second tokenized data string to said client process and, if not found: and executing said step of generating a tokenized data string, wherein said token generation algorithm is configured to embed within said new tokenized data string a domain designator corresponding to said first domain.

14. The method of claim 13, further comprising:
    storing said tokenized data string in said first data vault; and updating said replica of said first data vault at each of said plurality of second domains.

15. The method of claim 13, wherein said tokenized data string comprises (a) said domain designator, (b) a number having a string length of (N−2) characters, and (c) a single check digit calculated according to said checksum validation routine, wherein said tokenized data string has a total string length of N characters, and N is an integer.

16. The method of claim 15, wherein said tokenized data string is generated such that it passes said checksum validation routine.

17. The method of claim 15, wherein said tokenized data string is generated such that it fails said checksum validation routine.

18. The method of claim 15, wherein said number having a string length of (N−2) characters is a random number or a sequence number.

19. The method of claim 13, wherein said tokenized data string has a total string length of N characters, and wherein said token generation algorithm is configured to:
  preserve X characters of said input data string as a head portion of said tokenized data string;
  generate a body portion of said tokenized data string having a string length of Y characters; and
  preserve Z characters of said input data string as a tail portion of said tokenized data string, wherein X, Y, Z, and N are integers, and wherein X plus Y plus Z equals N.

20. The method of claim 19, wherein said body portion comprises (a) said domain designator, (b) a number having a string length of (Y−2) characters, and (c) a single check digit calculated according to said checksum validation routine, wherein said domain designator comprises a single digit between zero and nine.

21. The method of claim 20, wherein said body portion is generated such that said tokenized data string passes said checksum validation routine.

22. The method of claim 20 wherein said body portion is generated such that said tokenized data string fails said checksum validation routine.

23. The method of claim 20, wherein said number having a string length of (N−2) characters is a random number or a sequence number.

24. The method of claim 13, configured to recognize multiple tokens associated with the same sensitive data, said method further comprising the computer-implemented steps of:
  receiving a token lookup request from a second client process;
  searching said first data vault, which optionally contains said first tokenized data string including a first domain designator therein;
  searching at least one of said replicas of each of said plurality of second data vaults, which optionally contains said second tokenized data string including a second domain designator therein; and
  returning to said second client process a set of tokens including said first tokenized data string and said secondary tokenized data string.

25. The method of claim 24, wherein said second client process selects for its use a token from said set of tokens.

* * * * *